United States Patent
Kozuki et al.

(10) Patent No.: US 10,615,586 B2
(45) Date of Patent: Apr. 7, 2020

(54) OVERCURRENT PROTECTION DEVICE AND VEHICULAR ELECTRONIC CONTROL UNIT

(71) Applicant: DENSO TEN Limited, Kobe-shi, Hyogo (JP)

(72) Inventors: Yasunori Kozuki, Kobe (JP); Kosuke Urashima, Kobe (JP); Nobuhiro Shingo, Kobe (JP); Takaaki Kato, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 0 days.

(21) Appl. No.: 15/888,419

(22) Filed: Feb. 5, 2018

(65) Prior Publication Data
US 2018/0294635 A1    Oct. 11, 2018

(30) Foreign Application Priority Data

Apr. 6, 2017 (JP) .................................. 2017-076253

(51) Int. Cl.
*B60L 3/04* (2006.01)
*H02H 3/08* (2006.01)
*H02H 7/20* (2006.01)

(52) U.S. Cl.
CPC ............. *H02H 3/08* (2013.01); *B60L 3/04* (2013.01); *H02H 7/20* (2013.01)

(58) Field of Classification Search
CPC .......... B60L 3/04; H02H 1/0007; H02H 3/08; H02H 3/085; H02H 3/093; H02H 7/20
USPC ........................................................ 307/9.1
See application file for complete search history.

(56) References Cited

U.S. PATENT DOCUMENTS

| | | | | |
|---|---|---|---|---|
| 2002/0014943 A1* | 2/2002 | Sugiyama | ............. | H02H 3/087 337/4 |
| 2004/0184206 A1* | 9/2004 | Nomura | ............... | H02H 7/0833 361/31 |
| 2008/0315815 A1* | 12/2008 | Serizawa | .................. | F01P 7/08 318/453 |
| 2011/0058297 A1* | 3/2011 | Higashida | .......... | H03K 17/0822 361/93.9 |
| 2012/0081825 A1* | 4/2012 | Nakamura | ............. | H02H 3/087 361/93.8 |
| 2012/0169117 A1* | 7/2012 | Park | ...................... | H02J 7/0031 307/10.7 |
| 2013/0190973 A1* | 7/2013 | Meng | ..................... | B60K 37/06 701/36 |

(Continued)

FOREIGN PATENT DOCUMENTS

JP    S49-076052 A    7/1974
JP    H09-121446 A    5/1997

(Continued)

*Primary Examiner* — Thienvu V Tran
*Assistant Examiner* — Brian K Baxter
(74) *Attorney, Agent, or Firm* — Oliff PLC (57) ABSTRACT

There is provided an overcurrent protection device configured to protect a load from an overcurrent. A first overcurrent detector configured to detect the overcurrent, based on a value of a current flowing through the load, time for which the current flows through the load, and an overcurrent cutoff characteristic upon non-operation of the load. An overcurrent breaker that cuts off the overcurrent to the load when the first overcurrent detector detects the overcurrent.

6 Claims, 6 Drawing Sheets

(56) References Cited

U.S. PATENT DOCUMENTS

| | | | | |
|---|---|---|---|---|
| 2014/0347774 A1* | 11/2014 | Uehara | ................ | H02H 3/0935 |
| | | | | 361/87 |
| 2015/0318850 A1* | 11/2015 | Hiyama | ............... | H03K 17/163 |
| | | | | 318/400.26 |
| 2015/0381170 A1* | 12/2015 | Yamamoto | .............. | F02P 3/055 |
| | | | | 327/109 |
| 2016/0013629 A1* | 1/2016 | Nagatomo | ............... | H02H 5/04 |
| | | | | 361/93.8 |
| 2017/0187319 A1* | 6/2017 | Ozawa | ................. | H02H 3/0935 |
| 2018/0145581 A1* | 5/2018 | Watanabe | ............. | H02M 3/155 |

FOREIGN PATENT DOCUMENTS

| | | |
|---|---|---|
| JP | 2006-202534 A | 8/2006 |
| JP | 2009-011031 A | 1/2009 |
| JP | 2014-230396 A | 12/2014 |

\* cited by examiner

OVERCURRENT PROTECTION DEVICE AND VEHICULAR ELECTRONIC CONTROL UNIT

CROSS-REFERENCE TO RELATED APPLICATIONS

This application is based on and claims priority under 35 USC 119 from Japanese Patent Application No. 2017-76253 filed on Apr. 6, 2017.

BACKGROUND

Technical Field

The present disclosure relates to an overcurrent protection device and a vehicular electronic control unit.

Related Art

In the related art, in order to protect a load, which is connected to a power supply via an electronic control unit (ECU) and the like of a vehicle, a wire harness, which is used so as to connect the load to the power supply, and the like from an overcurrent caused due to a short or the like, an overcurrent cutoff device having a fuse configured to mechanically cut off the connection between the load and the power supply upon occurrence of the overcurrent has been used. However, when the cutoff is made by the fuse, the fuse is melted down, so that the fuse cannot be reused. Therefore, it is necessary to replace the component (fuse) so as to recover the overcurrent cutoff device after the cutoff is made by the fuse.

In order to cut off the overcurrent from the load without replacing the component, an overcurrent cutoff device has been suggested which is configured to determine whether the overcurrent has flowed through the load, based on an overcurrent cutoff characteristic equivalent to a fuse characteristic (for example, refer to Patent Document 1).

[Patent Document 1] JP-A-2014-230396

However, when it is determined whether the overcurrent has flowed through the load, based on the overcurrent cutoff characteristic equivalent to the fuse characteristic, the overcurrent cutoff device becomes complicated and is enlarged, so that the power consumption of the overcurrent cutoff device increases.

SUMMARY

It is therefore an object of the present disclosure to provide an overcurrent protection device and a vehicular electronic control unit capable of protecting a load from an overcurrent without increasing the power consumption upon non-operation of the load.

According to an aspect of the embodiments of the present invention, there is provided an overcurrent protection device configured to protect a load from an overcurrent, the overcurrent protection device including: a first overcurrent detector configured to detect the overcurrent, based on a value of a current flowing through the load, time for which the current flows through the load, and an overcurrent cutoff characteristic upon non-operation of the load, and an overcurrent breaker that cuts off the overcurrent to the load when the first overcurrent detector detects the overcurrent.

The overcurrent protection device may further include a second overcurrent detector configured to detect the overcurrent upon operation of the load, based on a value of a current flowing through the load upon the operation of the load, time for which the current flows through the load upon the operation of the load, and an overcurrent cutoff characteristic upon the operation of the load. The overcurrent breaker may cut off the overcurrent to the load when the second overcurrent detector detects the overcurrent.

In the overcurrent protection device, the first overcurrent detector may detect the overcurrent when time for which a value of the current flowing through the load upon the operation of the load is larger than a first threshold value is greater than a second threshold value, and the first threshold value and the second threshold value are determined by the overcurrent cutoff characteristic upon the non-operation of the load, and the second overcurrent detector may detect the overcurrent when time for which a value of the current flowing through the load upon the operation of the load is larger than a third threshold value is greater than a fourth threshold value, the third threshold value and the fourth threshold value are determined by the overcurrent cutoff characteristic upon the operation of the load, the third threshold value may be smaller than the first threshold value, and the fourth threshold value may be smaller than the second threshold value.

In the overcurrent protection device, the first overcurrent detector may be configured to detect the overcurrent upon the non-operation of the load, and to stop the detection of the overcurrent upon the operation of the load.

In the overcurrent protection device, the overcurrent cutoff characteristic upon the operation of the load is determined, depending on a surrounding temperature.

A vehicular electronic control unit of the present disclosure may include the overcurrent protection device of the present disclosure.

According to the present disclosure, it is possible to protect the load from the overcurrent without increasing the power consumption upon the non-operation of the load.

BRIEF DESCRIPTION OF THE DRAWINGS

Exemplary embodiments of the present invention will be described in detail based on the following figures, wherein.

DETAILED DESCRIPTION

The overcurrent protection device and the vehicular electronic control unit of the present disclosure will be described with reference to the drawings.

Figure 1:
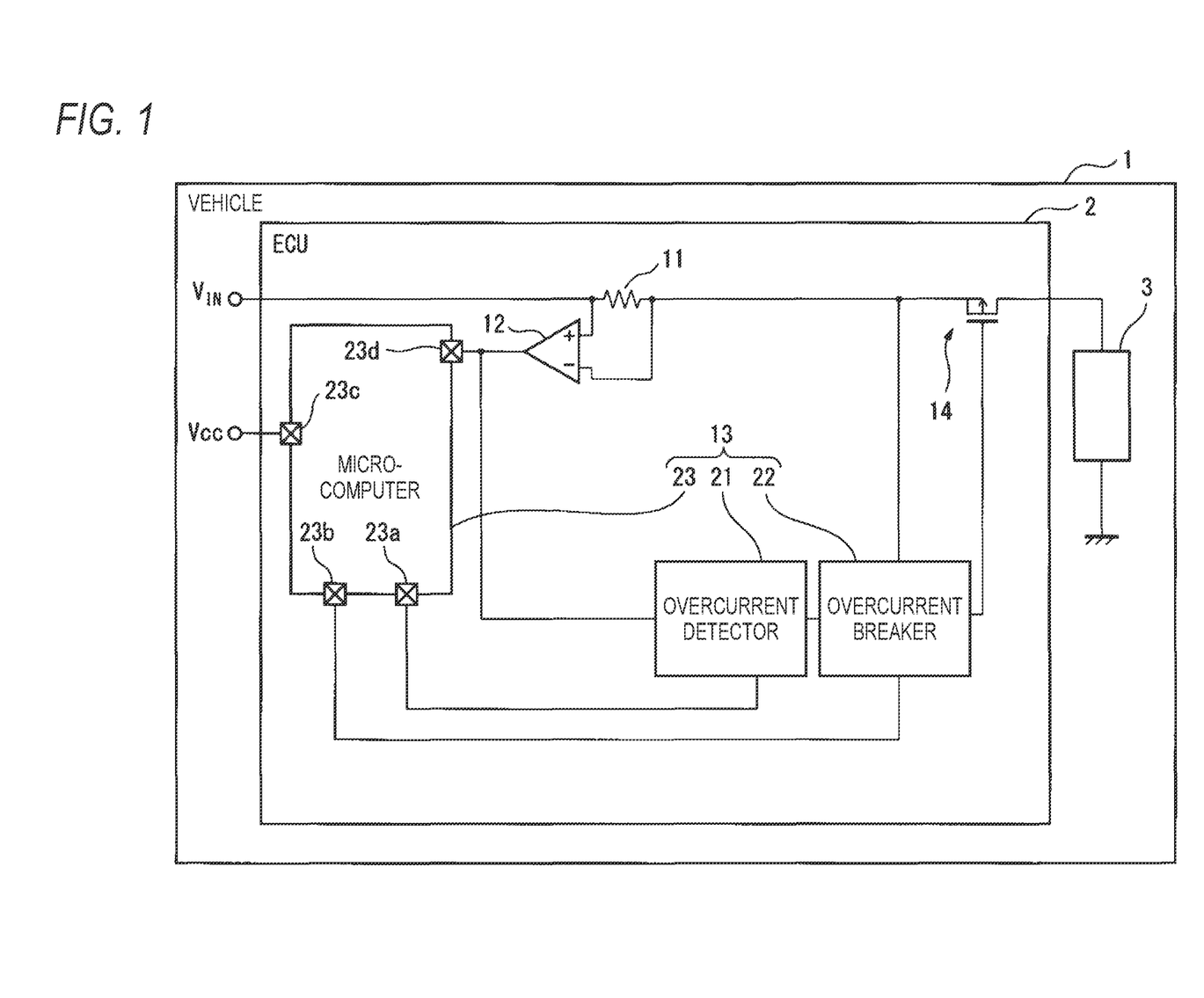
FIG. 1 depicts a vehicle in which an electronic control unit including an illustrative embodiment of an overcurrent protection device of the present disclosure is mounted.

FIG. 1 depicts a vehicle in which an electronic control unit including an illustrative embodiment of an overcurrent protection device of the present disclosure is mounted. A load 3 connected to an electronic control unit (ECU) 2 mounted in a vehicle 1 is applied with a voltage VIN by a regular power supply (not shown) connected to the ECU 2 through a wire harness (not shown). The ECU 2 is an ECU configured to control an audio device, a navigation device and the like, for example, and the load 3 is a power amplifier of the audio device, the navigation device and the like, for example.

The ECU 2 includes a shunt resistance 11, a current sensor amplifier 12, an overcurrent protection device 13, and a PMOS transistor 14. The shunt resistance 11 is arranged between the regular power supply and the load 3 so as to monitor a value of current flowing through the load 3. The current sensor amplifier 12 is configured to amplify a voltage between both ends of the shunt resistance, which corresponds to the value of the current flowing through the load 3, and to output an amplified voltage $V_{ocp}$.

The overcurrent protection device 13 is provided so as to protect the load 3 from the overcurrent, and includes an overcurrent detector 21, an overcurrent breaker 22, and a microcomputer 23. The overcurrent detector 21 is an example of the first overcurrent detector, and the microcomputer 23 is an example of the second overcurrent detector.

The overcurrent detector 21 is connected to an output part of the current sensor amplifier 12 and a terminal 23a of the microcomputer 23, and is configured to detect the overcurrent to the load 3, based on the voltage $V_{ocp}$ output from the current sensor amplifier 12 and an overcurrent cutoff characteristic upon non-operation of the load 3 (which will be described later). The overcurrent breaker 22 is connected to the overcurrent detector 21 and a terminal 23b of the microcomputer 23, and cuts off the overcurrent to the load 3 when the overcurrent detector 21 detects the overcurrent to the load 3. That is, the overcurrent breaker 22 turns off the PMOS transistor 14 when the overcurrent detector 21 detects the overcurrent to the load 3.

The microcomputer 23 is applied with an accessory voltage $V_{CC}$ by an accessory power supply (not shown) connected to a terminal 23c. The microcomputer 23 includes a CPU configured to execute a variety of control programs, and an A/D converter configured to convert the voltage $V_{ocp}$, which is input from the current sensor amplifier 12 to a terminal 23d upon operation of the load 3, in an analog/digital (A/D) conversion manner. The microcomputer 23 further includes a RAM in which data for control such as data of the voltage $V_{ocp}$ acquired (sampled) every predetermined time period (sampling time period) and A/D converted is temporarily stored, and a ROM in which a map (which will be described later), a control program and the like are stored. The load 3 is in an operation state when the microcomputer 23 is in an operation state, and is in a non-operation state when the microcomputer 23 is in a sleep state or an inactive state.

In this illustrative embodiment, the microcomputer 23 is configured to detect the overcurrent to the load 3 upon the operation of the load 3, based on the voltage $V_{ocp}$ output from the current sensor amplifier 12 upon the operation of the load 3 and an overcurrent cutoff characteristic upon the operation of the load 3 (which will be described later).

The PMOS transistor 14 is an element that is to be on and off by the overcurrent breaker 22. As the element that is to be on and off by the overcurrent breaker 22, an element except the PMOS transistor may also be used.

Figure 2:
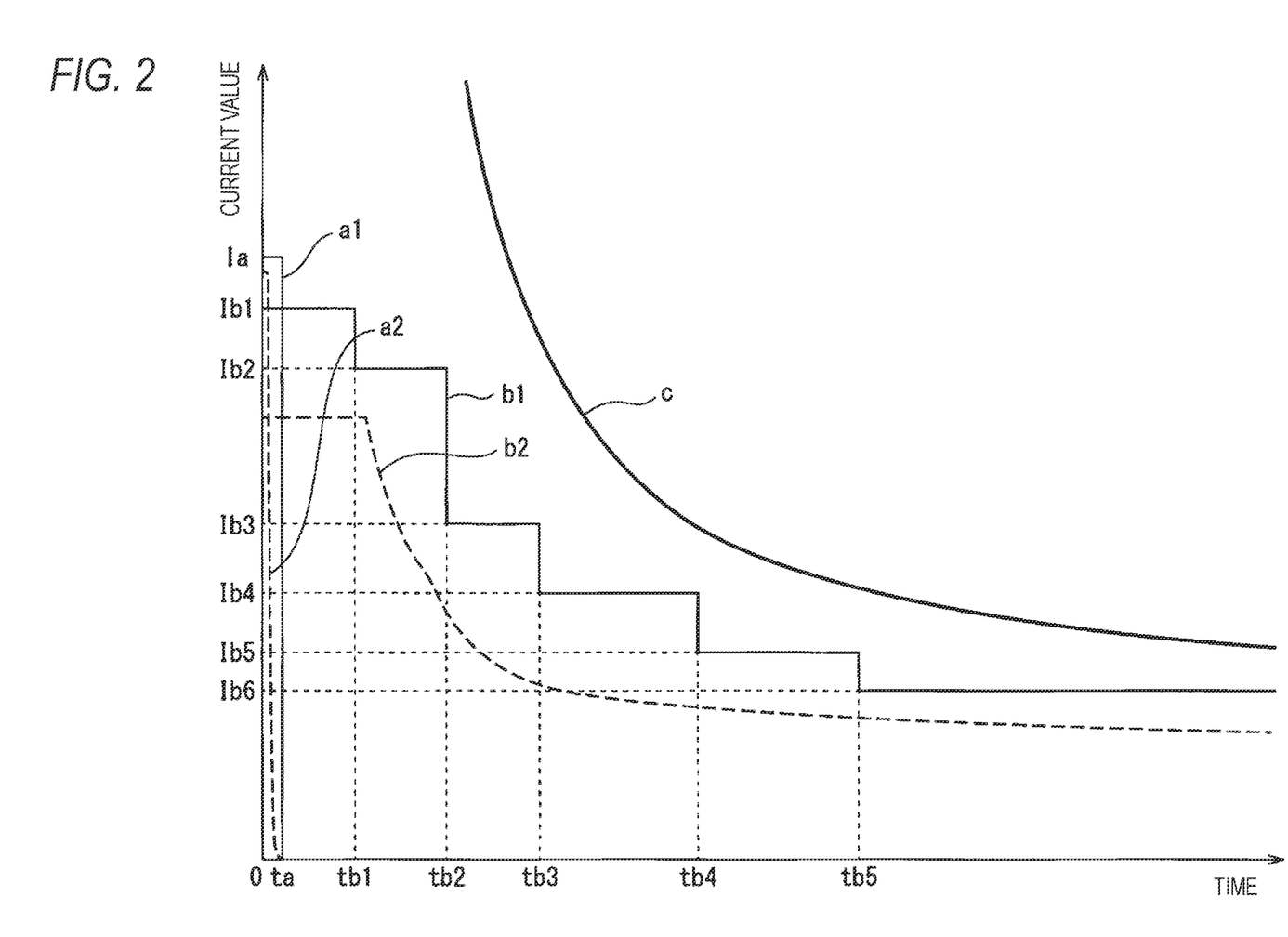
FIG. 2 is a graph depicting a cutoff characteristic upon non-operation of a load and a cutoff characteristic upon operation of the load at a surrounding temperature of room temperature.

FIG. 2 is a graph depicting a cutoff characteristic upon the non-operation of the load and a cutoff characteristic upon the operation of the load at a surrounding temperature of room temperature (for example, 20° C. to 30° Q. In FIG. 2, values of the current flowing to the load 3 are indicated in the vertical axis, and time for which the current flows through the load 3 is indicated in the horizontal axis.

In FIG. 2, an overcurrent cutoff characteristic a1 upon the non-operation of the load 3 defines a conductive region in which the current to the load 3 is allowed upon the non-operation of the load 3 and a cutoff region in which the current to the load 3 is cut off upon the non-operation of the load 3. The conductive region in which the current to the load 3 is allowed upon the non-operation of the load 3 is a region surrounded by the vertical axis, the horizontal axis and the overcurrent cutoff characteristic a1. The cutoff region in which the current to the load 3 is cut off upon the non-operation of the load 3 is a region obtained by excluding the conductive region in which the current to the load 3 is allowed upon the non-operation of the load 3 from the graph of FIG. 2. The overcurrent cutoff characteristic a1 is defined by a current value Ia and time ta. The current value Ia is a threshold value for overcurrent detection, and is an example of the first threshold value. The time ta is a threshold value for overcurrent detection, and is an example of the second threshold value.

The overcurrent cutoff characteristic a1 is such a characteristic that a noise to be input to the load 3 upon the non-operation of the load 3, rush current to temporarily flow upon connection of the load 3 to the regular power supply, and the like are allowed and the overcurrent to the load 3 upon the non-operation of the load 3 is cut off. That is, the overcurrent cutoff characteristic a1 is determined on the basis of a load characteristic a2 upon the non-operation of the load 3, which is in the conductive region where the current to the load 3 is allowed upon the non-operation of the load 3, so as to allow the noise, which is to be input to the load 3 upon the non-operation of the load 3, the rush current, which is to temporarily flow upon connection of the load 3 to the regular power supply, and the like. The load characteristic a2 is determined by at least one of a voltage of the regular power supply, an internal resistance, an impedance of the wire harness, a contact resistance of a connector and the like, an impedance in the ECU 2 and an input capacity of a device to be connected to the ECU 2, for example.

In this illustrative embodiment, the overcurrent detector 21 detects the overcurrent to the load 3 when time for which a current value $I_{ocp}$ corresponding to the voltage $V_{ocp}$ is larger than the current value Ia is longer than time ta. When the overcurrent detector 21 detects the overcurrent to the load 3, it instructs the overcurrent breaker 22 to turn off the PMOS transistor 14.

An overcurrent cutoff characteristic b1 upon the operation of the load 3 defines a conductive region in which the current to the load 3 is allowed upon the operation of the load 3 and a cutoff region in which the current to the load 3 is cut off upon the operation of the load 3, in a step shape (a pseudo-curve shape). The conductive region in which the current to the load 3 is allowed upon the operation of the load 3 is a region surrounded by the vertical axis, the horizontal axis and the overcurrent cutoff characteristic b1. The cutoff region in which the current to the load 3 is cut off upon the operation of the load 3 is a region obtained by excluding the conductive region in which the current to the load 3 is allowed upon the operation of the load 3 from the graph of FIG. 2. The overcurrent cutoff characteristic b1 is defined by current values Ib1, Ib2, Ib3, Ib4, Ib5, Ib6

(Ib1>Ib2>Ib3>Ib4>Ib5>Ib6) smaller than the current value Ia and times tb1, tb2, tb3, tb4, tb5 (tb1>tb2>tb3>tb4>tb5) shorter than time ta. The current values Ib1, Ib2, Ib3, Ib4, Ib5 and times tb1, tb2, tb3, tb4, tb5 are threshold values for overcurrent detection. A combination of the current value Ib1 and time tb1, a combination of the current value Ib2 and time tb2, a combination of the current value Ib3 and time tb3, a combination of the current value Ib4 and time tb4 and a combination of the current value Ib5 and time tb5 are examples of the combination of the third threshold value and the fourth threshold value.

The overcurrent cutoff characteristic b1 is a characteristic of cutting off the overcurrent to the load 3 upon the operation of the load 3. That is, the overcurrent cutoff characteristic b1 is determined on the basis of a load characteristic b2 upon the operation of the load 3, which is in the conductive region where the current to the load 3 is allowed upon the operation of the load 3, so as to cut off the overcurrent to the load 3 upon the operation of the load 3. Also, the overcurrent cutoff characteristic b1 is between the load characteristic b2 and a wire harness smoke generation characteristic c upon the operation of the load 3, which indicates a relation between a value of current upon smoke generation of the wire harness connected to the ECU 2 and time for which the current continues to flow through the wire harness. The load characteristic b2 is determined by at least one of a type of a device to be connected to the ECU 2 and a parameter of the device, for example.

In this illustrative embodiment, the microcomputer 23 is configured to store, in the ROM, a map of current values and times indicated by the overcurrent cutoff characteristic b1. The microcomputer 23 is configured to determine whether there is the overcurrent to the load 3 by referring to the map upon the operation of the load 3. For example, the microcomputer 23 detects the overcurrent to the load 3 when time for which the current value $I_{ocp}$ is larger than the current value Ib1 is longer than time tb1. Also, the microcomputer 23 detects the overcurrent to the load 3 when time for which the current value $I_{ocp}$ is smaller than the current value Ib1 but is larger than the current value Ib2 is longer than time tb2 or when time for which the current value $I_{ocp}$ is smaller than the current value Ib2 but is larger than the current value Ib3 is longer than time tb3. Also, the microcomputer 23 detects the overcurrent to the load 3 when time for which the current value $I_{ocp}$ is smaller than the current value Ib3 but is larger than the current value Ib4 is longer than time tb4 or when time for which the current value $I_{ocp}$ is smaller than the current value Ib4 but is larger than the current value Ib5 is longer than time tb5. When the microcomputer 23 detects the overcurrent to the load 3, it instructs the overcurrent breaker 22 to turn off the PMOS transistor 14.

Figure 3:
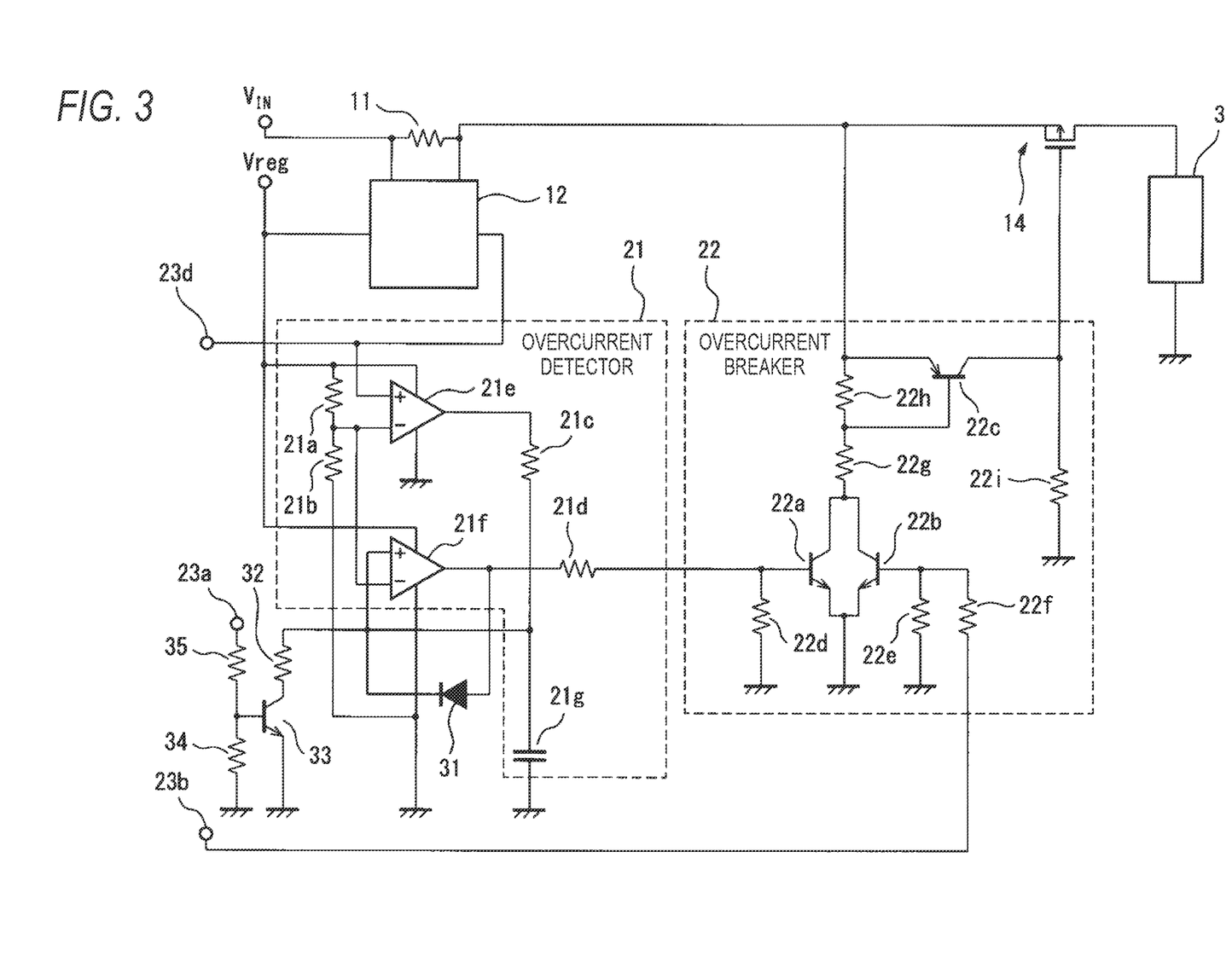
FIG. 3 is a partial detailed view of FIG. 1.

FIG. 3 is a partial detailed view of FIG. 1. In FIG. 3, the current sensor amplifier 12 is supplied with the voltage $V_{reg}$ that is generated by a regulator that is sourced VIN (not shown).

The overcurrent detector 21 has resistances 21a, 21b, 21c, 21d, comparators 21e, 21f, and a capacitor 21g. A connection portion of the resistance 21b and the resistance 21a where one end of the resistance 21b is earthed, the other end of the resistance 21b is connected to one end of the resistance 21a and the other end of the resistance 21a is connected to the regulator is connected to inverting input parts of the comparators 21e, 21f, respectively. Therefore, when resistance values of the resistances 21a, 21b are denoted with R1, R2, a voltage of $R1 \cdot V_{reg}/(R1+R2)$ is respectively supplied to the inverting input parts of the resistance comparators 21e, 21f. When a resistance value of the shunt resistance is denoted with Rs and an amplification factor of the current sensor amplifier is denoted with A, the values of R1 and R2 are appropriately set so that $R1 \cdot V_{reg}/(R1+R2)$ is the same as $A \cdot Rs \cdot Ia$.

A non-inverting input part of the comparator 21e is connected to the output part of the current sensor amplifier 12. An output part of the comparator 21e is earthed via the resistance 21c and the capacitor 21g, and outputs a low signal corresponding to a zero voltage when the voltage $V_{ocp}$ is equal to or lower than the voltage $R1 \cdot V_{reg}/(R1+R2)$ and outputs a high signal corresponding to the voltage $V_{reg}$ when the voltage $V_{ocp}$ is higher than the voltage $R1 \cdot V_{reg}/(R1+R2)$.

A resistance value of the resistance 21c and a capacity of the capacitor 21g are respectively set so that a time constant of an RC circuit configured by the resistance 21c and the capacitor 21g, i.e., a product of a resistance value of the resistance 21c and a capacity of the capacitor 21g is the same as time ta. A non-inverting input part of the comparator 21f is connected to a connection portion of the resistance 21c and the capacitor 21g. An output part of the comparator 21f is connected to the overcurrent breaker 22 via the resistance 21d. Also, the output part of the comparator 21f is connected to an anode of a diode 31, and a cathode of the diode 31 is connected to the non-inverting input part of the comparator 21f and the connection portion of the resistance 21c and the capacitor 21g.

A connection portion of the non-inverting input part of the comparator 21f and the cathode of the diode 31 is connected to a collector of an npn transistor 33 via a resistance 32, and an emitter of the npn transistor 33 is earthed. A base of the npn transistor 33 is connected to a connection portion of a resistance 34 having one end earthed and a resistance 35 having one end connected to the terminal 23a of the microcomputer 23.

The overcurrent breaker 22 has npn transistors 22a, 22b, a pnp transistor 22c, and resistances 22d, 22e, 22f, 22g, 22h, 22i. A base of the npn transistor 22a is connected to a connection portion of the resistance 21d having one end connected to the output part of the comparator 21f and the resistance 22d having one end earthed. An emitter of the npn transistor 22a is connected to an emitter of the npn transistor 22b, and a connection portion of the emitter of the npn transistor 22a and the emitter of the npn transistor 22b is earthed. A collector of the npn transistor 22a is connected to a collector of the npn transistor 22b.

A base of the npn transistor 22b is connected to a connection portion of the resistance 22e having one end earthed and the resistance 22f having one end connected to the terminal 23b of the microcomputer 23. A connection portion of the collector of the npn transistor 22a and the collector of the npn transistor 22b is connected to one end of the resistance 22g. The other end of the resistance 22g is connected to a base of the pnp transistor 22c and one end of the resistance 22h, and the other end of the resistance 22h is connected to an emitter of the pnp transistor 22c and between the shunt resistance 11 and a gate of the PMOS transistor 14. A collector of the pnp transistor 22c is connected to a connection portion of the other end of the resistance 22i having one end earthed and the gate of the PMOS transistor 14.

When the voltage $V_{ocp}$ higher than the voltage $R1 \cdot V_{reg}/(R1+R2)$ is input to the non-inverting input part of the comparator 21e, the output part of the comparator 21e outputs a high signal corresponding to the voltage $V_{reg}$. The high signal output from the output part of the comparator 21e is input to the non-inverting input part of the comparator 21f with being delated by time ta, and the output part of the comparator 21f outputs a high signal corresponding to the voltage $V_{reg}$. The high signal output from the output part of the comparator 21f is input to the non-inverting input part of the comparator 21f via the diode 31, and the signal output from the output part of the comparator 21f is kept (latched) in a high state while the capacitor 21g is sufficiently charged. When the signal output from the output part of the comparator 21f is kept at the high state, the npn transistor 22a is kept in an on-state, and a signal corresponding to a voltage obtained by resistance-dividing the voltage VIN at the resistance 22h and the resistance 22g is input to the base of the pnp transistor 22c, so that the pnp transistor 22c becomes on. When the pnp transistor 22c becomes on, a voltage between the gate and source of the PMOS transistor 14 becomes zero and the PMOS transistor becomes off. When the overcurrent detector 21 detects the overcurrent to the load 3, the signal output from the output part of the comparator 21f is kept at the high state. Accordingly, the overcurrent detector 21 can instruct the overcurrent breaker 22 to turn off the PMOS transistor 14.

On the other hand, when the microcomputer 23 detects the overcurrent to the load 3 upon the operation of the load 3, the microcomputer 23 supplies a signal for keeping the npn transistor 22b in the on-state to the base of the npn transistor 22b via the terminal 23b. When the npn transistor 22b is kept in the on-state, the signal corresponding to the voltage obtained by resistance-dividing the voltage VIN at the resistance 22h and the resistance 22g is input to the base of the pnp transistor 22c, so that the pnp transistor 22c becomes on. When the pnp transistor 22c becomes on, the voltage between the gate and source of the PMOS transistor 14 becomes zero and the PMOS transistor becomes off. When the microcomputer 23 detects the overcurrent to the load 3 upon the operation of the load 3, it keeps the npn transistor 22b in the on-state. Accordingly, the microcomputer 23 can instruct the overcurrent breaker 22 to turn off the PMOS transistor 14.

The overcurrent detector 21 may stop the detection of the overcurrent to the load 3 upon the operation of the load 3. In this case, the microcomputer 23 inputs a signal for switching the npn transistor 33 to the on-state to the base of the npn transistor 33 via the terminal 23a. When the npn transistor 33 becomes on, the signal from the output part of the comparator 21e via the resistance 21c, the signal from the output part of the comparator via the diode 31 and the charges accumulated in the capacitor 21g flow from the collector to the emitter of the npn transistor 33, and the keeping (latch) of the signal output from the output part of the comparator 21f is released. Also, the overcurrent detector 21 may be configured to detect the overcurrent to the load 3 upon the non-operation of the load 3 and upon the operation of the load 3.

According to this illustrative embodiment, the overcurrent detector 21 configured to detect the overcurrent to the load 3 on the basis of the value of the current $I_{ocp}$, the time for which the current $I_{ocp}$ flows through the load 3 and the overcurrent cutoff characteristic upon the non-operation of the load 3 is used. Accordingly, it is possible to simplify the configuration of the overcurrent detector 21, as compared to a configuration of determining whether the overcurrent has flowed through the load 3 on the basis of the overcurrent cutoff characteristic equivalent to the fuse characteristic.

Therefore, since the increase in the power consumption of the overcurrent protection device 13 resulting from the complication of the overcurrent protection device 13 is prevented, it is possible to protect the load 3 from the overcurrent without increasing the power consumption.

Also, the current value Ia and time to are used as the threshold value. Thereby, it is possible to protect the load 3 from the overcurrent while allowing the noise, which is to be input to the load 3 upon the non-operation of the load 3, the rush current, which is to temporarily flow when the load 3 is connected to the regular power supply, and the like.

Also, the microcomputer 23 is configured to detect the overcurrent to the load 3 upon the operation of the load 3 on the basis of the value of the current $I_{ocp}$, the time for which the current $I_{ocp}$ flows through the load 3, and the overcurrent cutoff characteristic upon the operation of the load 3, i.e., the microcomputer 23 is configured not to detect the overcurrent to the load 3 upon the non-operation of the load 3. Therefore, it is possible to reduce the dark current of the microcomputer 23 upon the non-operation of the load 3.

When the overcurrent detector 21 detects the overcurrent to the load 3 upon the operation of the load 3, the current value Ia larger than the current values Ib1, Ib2, Ib3, Ib4, Ib5, Ib6 is used as the threshold value. Therefore, it is possible to cut off the overcurrent to the load 3 when the large current instantaneously flows.

Also, when the overcurrent detector 21 detects the overcurrent to the load 3 upon the operation of the load 3, it is possible to detect the overcurrent to the load 3 upon the operation of the load 3 even if the microcomputer 23 is out of order.

When the overcurrent detector 21 stops the detection of the overcurrent to the load 3 upon the operation of the load 3, an erroneous operation is not caused in the overcurrent protection device 13 even if a determination result as to whether or not the overcurrent to the load 3 by the overcurrent detector 21 and a determination result as to whether or not the overcurrent to the load 3 by the microcomputer 23 are not matched due to the current, which is not assumed.

Figure 4:
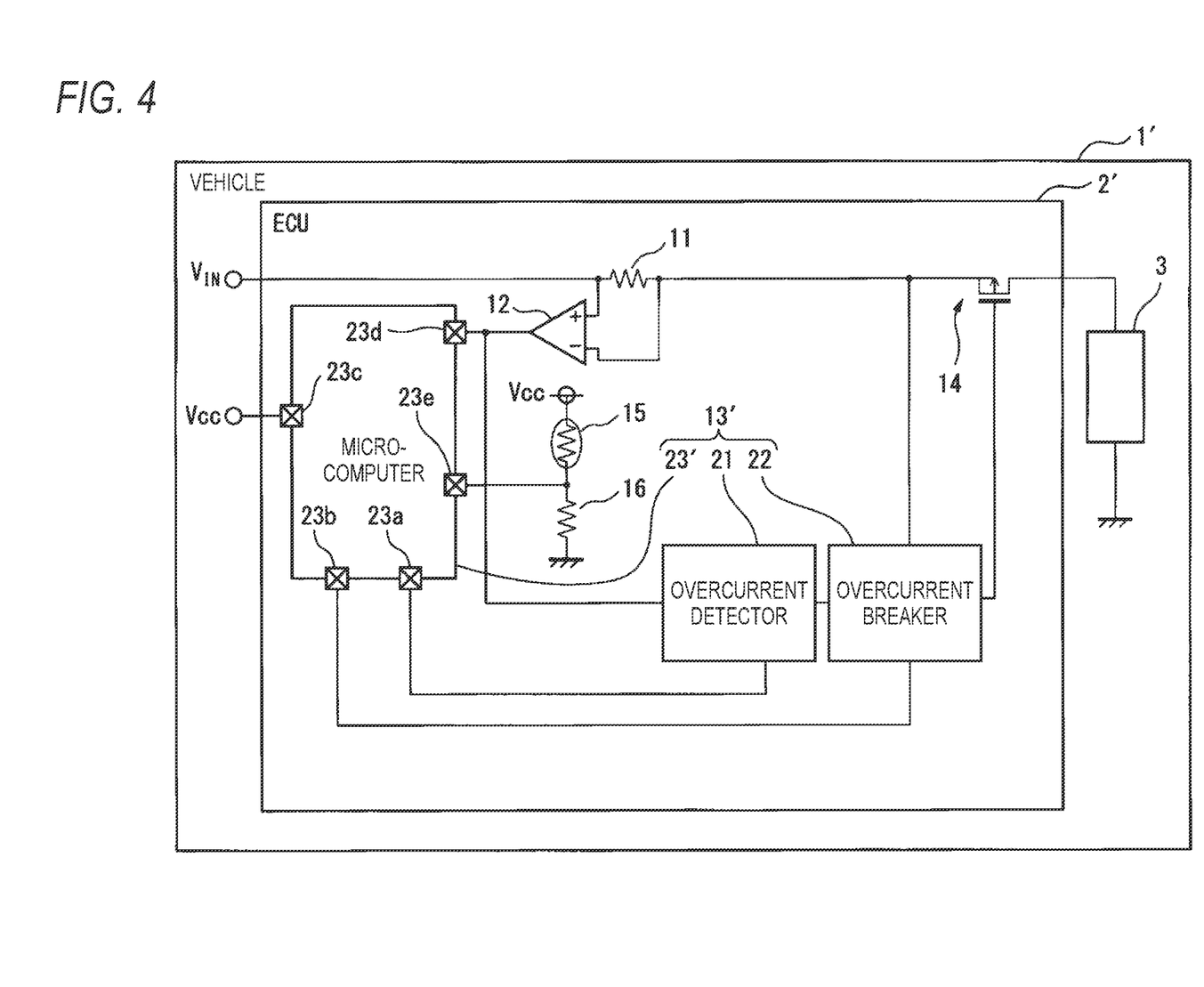
FIG. 4 depicts a vehicle in which the electronic control unit including another illustrative embodiment of the overcurrent protection device of the present disclosure is mounted.

FIG. 4 depicts a vehicle in which the electronic control unit including another illustrative embodiment of the overcurrent protection device of the present disclosure is mounted. An ECU 2' mounted in a vehicle 1' includes the shunt resistance 11, the current sensor amplifier 12, an overcurrent protection device 13', the PMOS transistor 14, the thermistor 15, and the resistance 16.

The overcurrent protection device 13' includes the overcurrent detector 21, the overcurrent breaker 22, and a microcomputer 23'. The microcomputer 23' is applied with the accessory voltage $V_{CC}$ by the accessory power supply (not shown) connected to the terminal 23c. The microcomputer 23' includes the CPU configured to execute a variety of control programs, the A/D converter configured to convert the voltage $V_{ocp}$ input from the current sensor amplifier 12 to the terminal 23d upon the operation of the load 3 in the A/D conversion manner, and an A/D converter configured to convert a voltage between both ends of the thermistor 15, which is input to the terminal 23e upon the operation of the load 3, in the A/D conversion manner. The microcomputer 23' further includes a RAM in which data for control such as data of the voltage $V_{ocp}$ acquired every predetermined time period and A/D converted and data of the voltage between both ends of the thermistor 15 acquired in correspondence to the data of the voltage $V_{ocp}$ is temporarily stored, and a ROM in which a map set for each surrounding temperature (which will be described later), a control program and the like are stored.

The thermistor 15 and the resistance 16 configure a voltage division circuit. Since the resistance value of the thermistor 15 changes depending on the surrounding temperature, the voltage between both ends of the thermistor 15 becomes a voltage corresponding to the surrounding temperature. Accordingly, the microcomputer 23' can detect the surrounding temperature on the basis of the value of the voltage between both ends of the thermistor 15.

Figure 5:
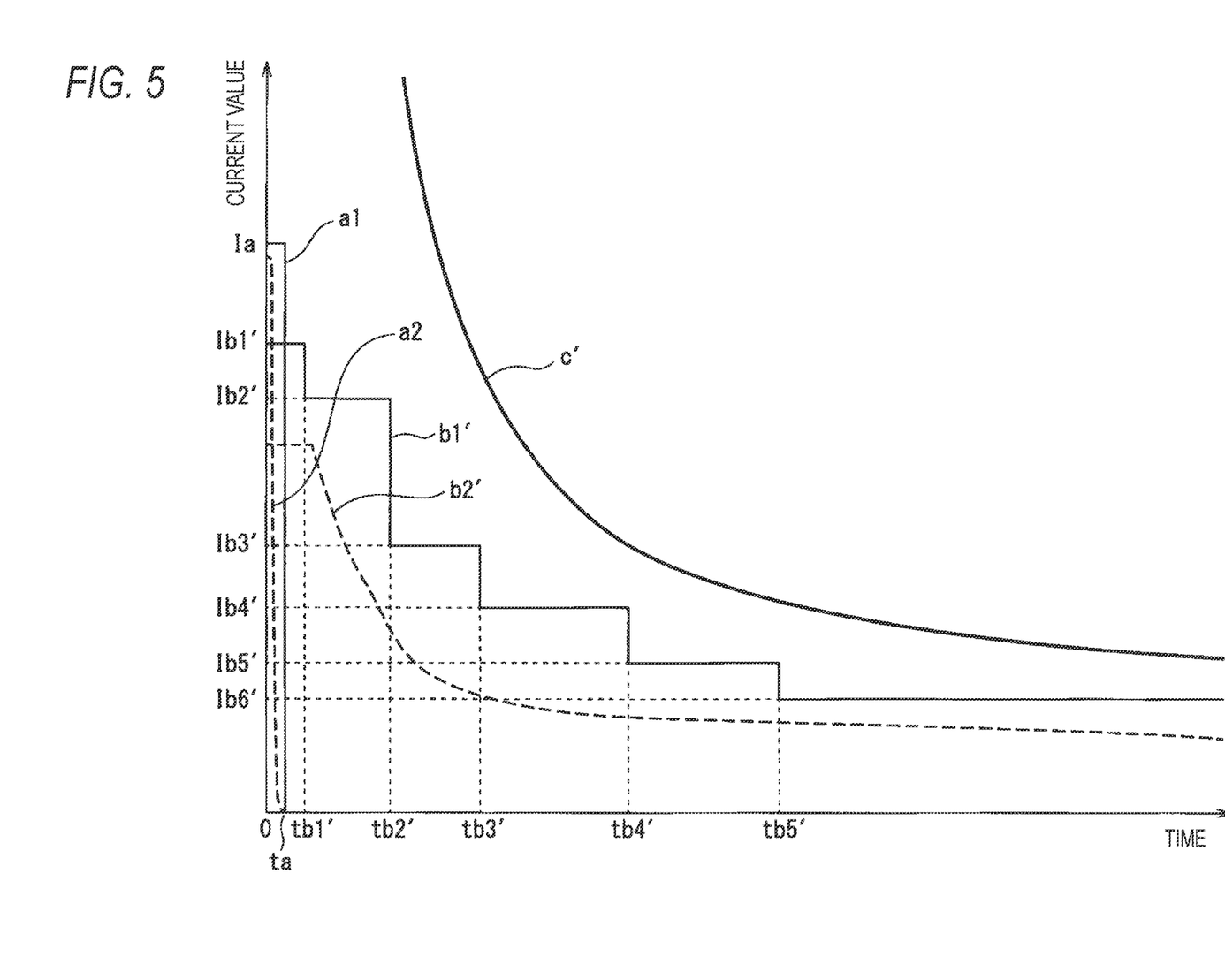
FIG. 5 is a graph depicting a cutoff characteristic upon the non-operation of the load and a cutoff characteristic upon the operation of the load at a surrounding temperature of high temperature.

FIG. 5 is a graph depicting a cutoff characteristic upon the non-operation of the load and a cutoff characteristic upon the operation of the load at a surrounding temperature of high temperature (for example, a temperature higher than 30° C.). A current value of an overcurrent cutoff characteristic b1' upon the operation of the load 3 is set smaller than the current value of the overcurrent cutoff characteristic b1 (FIG. 2) upon the operation of the load 3 at same time. The time of the overcurrent cutoff characteristic b1' upon the operation of the load 3 is set shorter than the time of the overcurrent cutoff characteristic b1 (FIG. 2) upon the operation of the load 3 at the same current value.

Also, a current value Ib1' is smaller than the current Ib1, a current value Ib2' is smaller than the current Ib2, a current value Ib3' is smaller than the current Ib3, a current value Ib4' is smaller than the current Ib4, a current value Ib5' is smaller than the current Ib5, and a current value Ib6' is smaller than the current Ib6.

Also, time tb1' is shorter than time tb1, time tb2' is shorter than time tb2, time tb3' is shorter than time tb3, time tb4' is shorter than time tb4, and time tb5' is shorter than time tb5.

Also, a current value of a load characteristic b2' upon the operation of the load 3 is set smaller than the current value of the load characteristic b2 (FIG. 2) upon the operation of the load 3 at same time. Also, a current value of a wire harness smoke generation characteristic c' upon the operation of the load 3 is set smaller than the current value of the wire harness smoke generation characteristic c (FIG. 2) upon the operation of the load 3 at same time.

Figure 6:
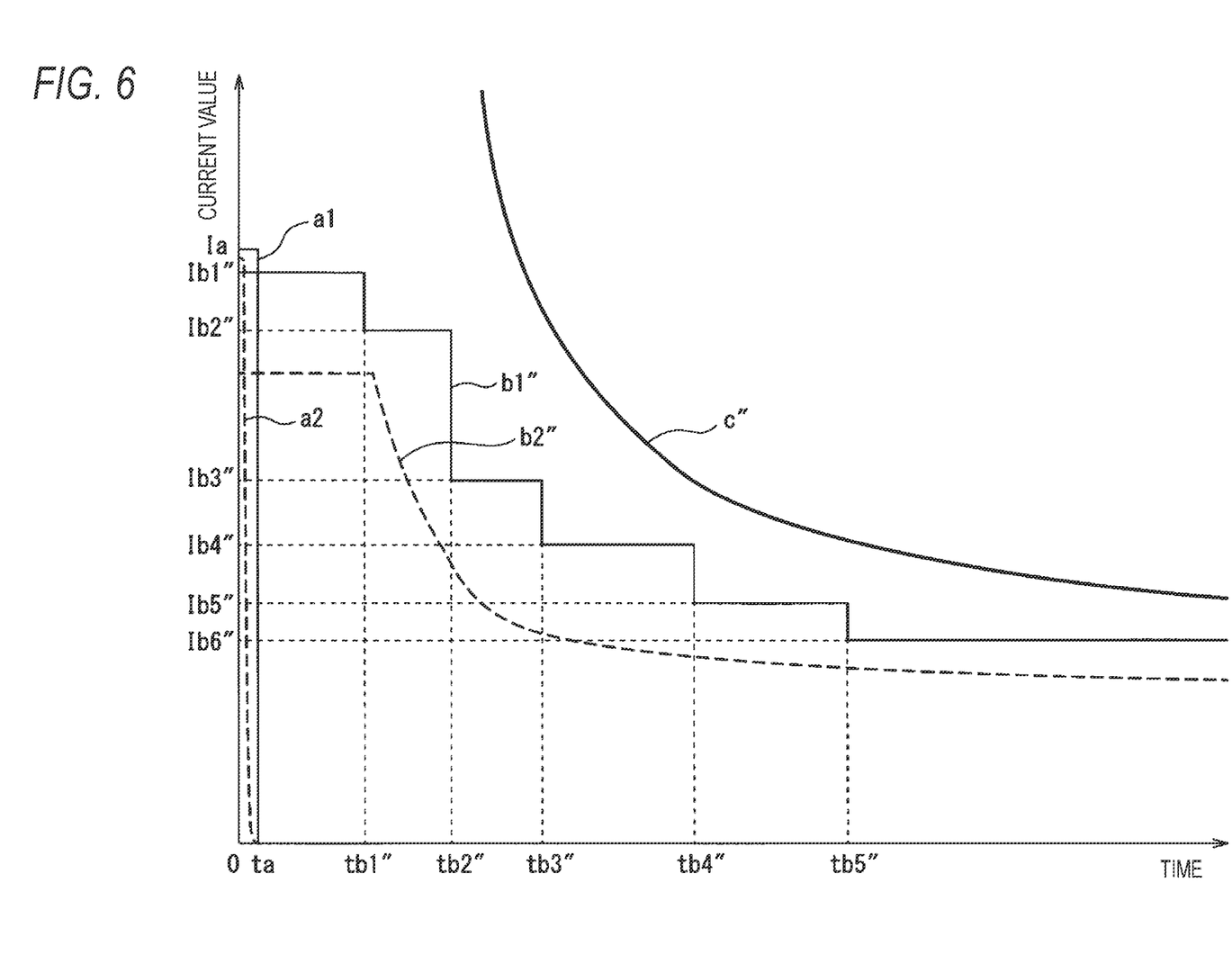
FIG. 6 is a graph depicting a cutoff characteristic upon the non-operation of the load and a cutoff characteristic upon the operation of the load at a surrounding temperature of low temperature.

FIG. 6 is a graph depicting a cutoff characteristic upon the non-operation of the load and a cutoff characteristic upon the operation of the load at a surrounding temperature of low temperature (for example, a temperature lower than 20° C.). A current value of an overcurrent cutoff characteristic b1" upon the operation of the load 3 is set larger than the current value of the overcurrent cutoff characteristic b1 (FIG. 2) upon the operation of the load 3 at same time. The time of the overcurrent cutoff characteristic b1" upon the operation of the load 3 is set longer than the time of the overcurrent cutoff characteristic b1 (FIG. 2) upon the operation of the load 3 at the same current value.

Also, a current value Ib1" is larger than the current Ib1, a current value Ib2" is larger than the current Ib2, a current value Ib3" is larger than the current Ib3, a current value Ib4" is larger than the current Ib4, a current value Ib5" is larger than the current Ib5, and a current value Ib6" is larger than the current Ib6.

Also, time tb1" is longer than time tb1, time tb2" is longer than time tb2, time tb3" is longer than time tb3, time tb4" is longer than time tb4, and time tb5" is longer than time tb5.

Also, a current value of a load characteristic b2" upon the operation of the load 3 is set larger than the current value of the load characteristic b2 (FIG. 2) upon the operation of the load 3 at same time. Also, a current value of a wire harness smoke generation characteristic c" upon the operation of the load 3 is set larger than the current value of the wire harness smoke generation characteristic c (FIG. 2) upon the operation of the load 3 at same time.

In this illustrative embodiment, the microcomputer 23' is configured to store, in the ROM, a map of current values and times indicated by the overcurrent cutoff characteristic b1, a map of current values and times indicated by the overcurrent cutoff characteristic b1', and a map of current values and times indicated by the overcurrent cutoff characteristic b1".

The microcomputer 23' is configured to select the map upon the operation of the load 3, depending on the surrounding temperature. For example, when the surrounding temperature is 20° C. to 30° C., the microcomputer 23 selects the map of current values and times indicated by the overcurrent cutoff characteristic b1. Also, when the surrounding temperature is below 20° C., the microcomputer 23 selects the map of current values and times indicated by the overcurrent cutoff characteristic b1". Also, when the surrounding temperature is above 30° C., the microcomputer 23 selects the map of current values and times indicated by the overcurrent cutoff characteristic b1'. Then, the microcomputer 23 determines whether there is the overcurrent to the load 3 by referring to the selected map.

According to this illustrative embodiment, the microcomputer 23' detects the overcurrent to the load 3 on the basis of the overcurrent cutoff characteristics b1, b1', b1" determined depending on the surrounding temperatures, so that it is possible to appropriately detect the overcurrent to the load 3, depending on the surrounding temperatures. Accordingly, it is possible to more correctly cut off the overcurrent to the load 3 upon the operation of the load 3.

In the illustrative embodiment shown in FIG. 4, the three maps of the current values and times indicated by the overcurrent cutoff characteristics determined depending on the surrounding temperatures are used. However, two or four or more maps of the current values and times indicated by the overcurrent cutoff characteristics determined depending on the surrounding temperatures may also be used.

What is claimed is:

1. An overcurrent protection device configured to protect a load from an overcurrent, the overcurrent protection device comprising:

a first overcurrent detector configured to detect the overcurrent, based on a value of a current flowing through the load, time for which the current flows through the load, and an overcurrent cutoff characteristic upon non-operation of the load, the overcurrent cutoff characteristic being a characteristic whereby a noise to be input to the load upon non-operation of the load and a rush current to temporarily flow upon connection of the load to a regular power supply are allowed, and the overcurrent upon non-operation to the load is cut off, and an overcurrent breaker that cuts off the overcurrent to the load when the first overcurrent detector detects the overcurrent, wherein the first overcurrent detector detects the overcurrent when time for which the value of the current flowing through the load upon operation of the load is larger than a first threshold value is greater than a second threshold value, and the first threshold value and the second threshold value are determined by the overcurrent cutoff characteristic upon the non-operation of the load.

2. The overcurrent protection device according to claim 1, further comprising a second overcurrent detector configured to detect the overcurrent upon operation of the load, based on either the value of the current flowing through the load upon the operation of the load or a value of another current flowing through the load upon the operation of the load, time for which the current flows through the load upon the operation of the load, and an overcurrent cutoff characteristic upon the operation of the load, wherein the overcurrent breaker cuts off the overcurrent to the load when the second overcurrent detector detects the overcurrent.

3. The overcurrent protection device according to claim 2, wherein the second overcurrent detector detects the overcurrent when time for which the value of the current flowing through the load upon the operation of the load is larger than a third threshold value is greater than a fourth threshold value, the third threshold value and the fourth threshold value are determined by the overcurrent cutoff characteristic upon the operation of the load, the third threshold value is smaller than the first threshold value, and the fourth threshold value is smaller than the second threshold value.

4. The overcurrent protection device according to claim 2, wherein the first overcurrent detector is configured to detect the overcurrent upon the non-operation of the load, and to stop the detection of the overcurrent upon the operation of the load.

5. The overcurrent protection device according to claim 2, wherein the overcurrent cutoff characteristic upon the operation of the load is determined, depending on a surrounding temperature.

6. A vehicular electronic control unit comprising the overcurrent protection device according to claim 1.

\* \* \* \* \*